Figure 1A:
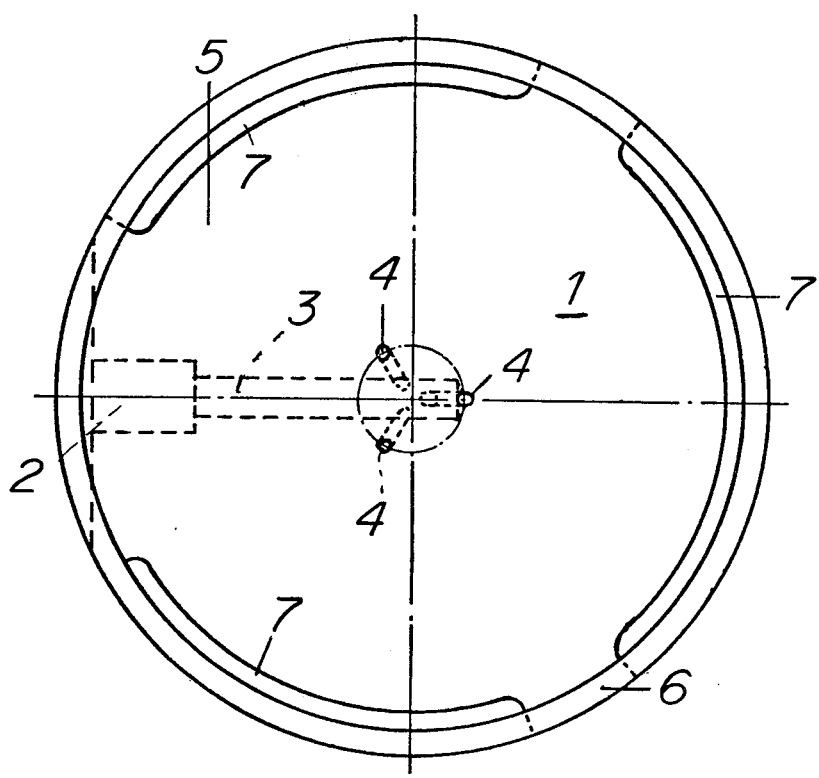

United States Patent [19]

Rahn et al.

[11] 4,118,058
[45] Oct. 3, 1978

[54] TOOL FOR THE CONTACT-FREE SUPPORT OF DISCS

[75] Inventors: Oskar Rahn; Hermann Krause, both of Burghausen, Fed. Rep. of Germany

[73] Assignee: Wacker-Chemitronic Gesellschaft fur Elektronik-Grundstoffe mbH, Burghausen, Fed. Rep. of Germany

[21] Appl. No.: 773,570

[22] Filed: Mar. 2, 1977

[30] Foreign Application Priority Data

Mar. 9, 1976 [DE] Fed. Rep. of Germany ....... 2609754

[51] Int. Cl.$^2$ .............................................. B66C 1/02
[52] U.S. Cl. ................................................. 294/67 B
[58] Field of Search ............... 294/64 B, 64 A, 64 R; 271/97, 98, 195; 302/21, 25, 29, 31

[56] References Cited

U.S. PATENT DOCUMENTS 3,438,668  4/1969  Olsson et al. ...................... 294/64 B
3,523,706  8/1970  Logue ................................ 294/64 B

FOREIGN PATENT DOCUMENTS 748,138  4/1956  United Kingdom .................. 294/64 B

OTHER PUBLICATIONS

IBM Technical Disclosure Bulletin, vol. 18, No. 6, Nov. 1975, 1837.

Primary Examiner—James B. Marbert
Attorney, Agent, or Firm—Allison C. Collard; Thomas M. Galgano

[57] ABSTRACT

A tool for the contact-free support of discs by gas streams impinging on the discs when emerging from the supporting face of the tool at an acute angle to the disc surface, which comprises a body having a supporting face, bores within said body for connection with an extraneous gas reservoir, means in said body directed at an acute angle with respect to the supporting face for discharge of gas flowing from the reservoir, said flow-through means consisting of nozzles or recesses being position at equal distance from each other on the surface of a cone whose base is enclosed by a circle concentric with an imaginary circle on the supporting face, said circle having a diameter of 0.2-0.6 supporting face-diameters, the cone having an angle of 20°-150° at the apex, and wherein the distance of the flow-through means on the surface of the cone is from $\frac{2}{3}r\pi$ to $0r$, measured at the periphery of the circle, and the radial widths of the flow-through means in the supporting face are about 0.02-3% of the supporting face diameter.

5 Claims, 4 Drawing Figures

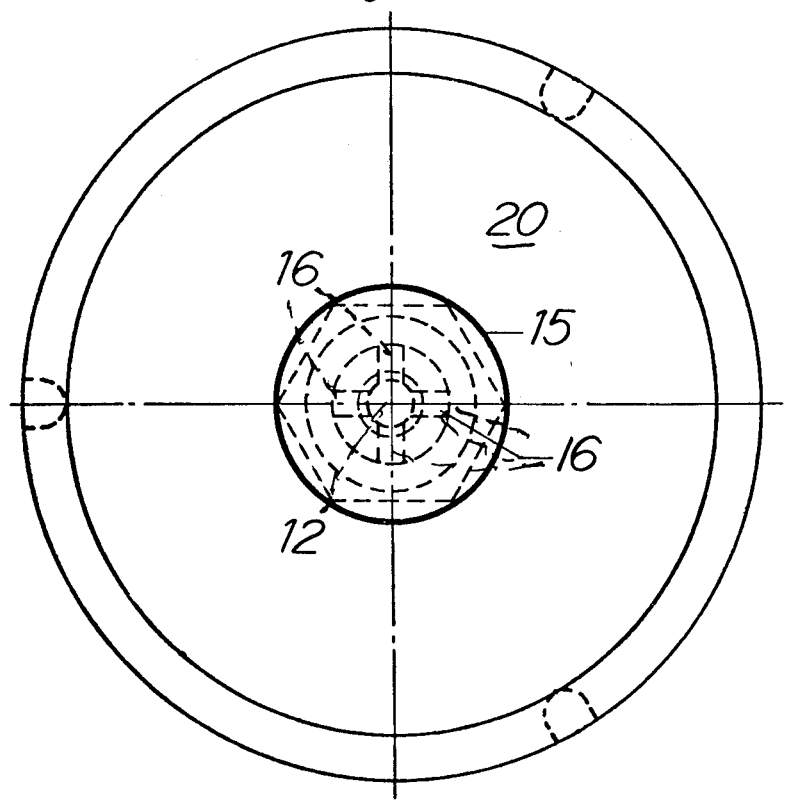
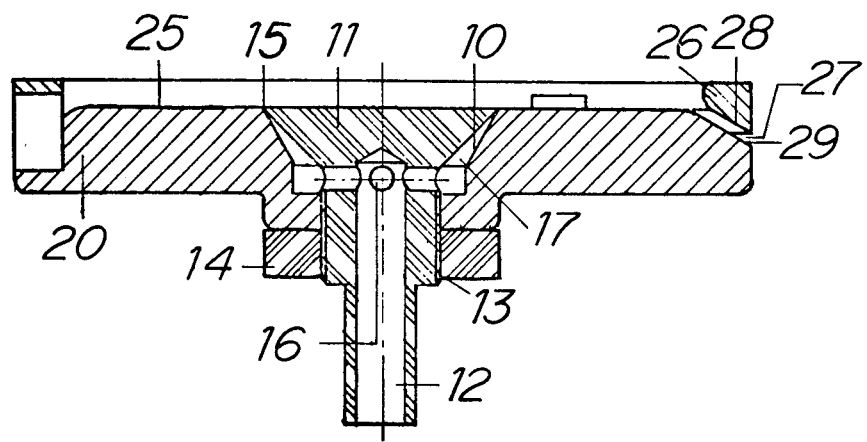

TOOL FOR THE CONTACT-FREE SUPPORT OF DISCS

This invention relates to a tool for supporting discs in a position without contact with the supporting face by means of the effect of gaseous jet streams emerging from the supporting face of the tool and impinging on the disc surface under an acute angle.

In a known supporting tool operating on the same physical principle, a gas is made to escape near the center of a circular supporting face from a nozzle countersunk in that face and emerging at a certain velocity from the nozzle, impinging at an acute angle onto a disc to be supported above the supporting face. When the tool is made to approach the surface of a disc with the supporting face, the radially escaping gas jet becomes laminar between part of the supporting face and the disc and the latter is supported as a consequence thereof; however, it is prevented by the gas jet from contacting the supporting tool. In order to prevent a sliding away or a fluttering of the discs, the known supporting tool is provided over two-thirds of the periphery of the face with a raised ledge. The gas jet escaping from the nozzle blows the disc against the ledge, so that scratches or even breaking of parts of the rim of the disc may be caused. Such damages may also occur when the disc is released and slides off laterally or trails against the ledge.

The known supporting tool has a number of other disadvantages. One shortcoming consists in the fact that when one disc is taken up, an adjacent disc may be blown away. Furthermore, it is impossible to combine several adjacent supporting tools, since they affect or influence one another.

It is another shortcoming that the diameters of the disc and of the supporting face have to be accurately correlated with respect to one another, since otherwise discs which are too large may extend obliquely beyond the ledge and not only cause scratches, but can drop off again. Small discs, on the other hand, having a diameter smaller than that of the supporting face, would be subject to fluttering, thus causing damage to their surfaces.

It is, therefore, the object of the present invention to provide a supporting tool which is free of all the mentioned shortcomings and which can be applied universally for supporting discs in position without contacting the supporting face.

Other objects and advantages of the invention will become apparent from the following detailed description and the accompanying drawings. These objects can be accomplished, according to the invention, by means of a supporting tool for discs comprising a body with a supporting face, bores within said body for connection with an extraneous gas reservoir, nozzle means or recesses in said body directed at an acute angle with respect to the supporting face for discharge of gas flowing from the reservoir, said nozzles or recesses being positioned at equal distance from each other on the surface of a cone whose base is enclosed by a circle concentric with an imaginary circle on the supporting face, said circle having a diameter of 0.2–0.6 supporting face-diameters, the cone having an angle of 20°–150° at the apex, and wherein the distance of the nozzles or recesses on the surface of the cone is from $\frac{2}{3} r\pi$ to $0.r$, measured at the periphery of the circle, and the radial widths of the nozzles or recesses are about 0.02-3% of the supporting face-diameter. It is advantageous to provide a pressure-regulating device between the bores of the tool and the gas reservoir.

In principle, any solid material which can be machined, may be used as base material for producing such supporting tools. Especially useful are metals, e.g., stainless steel or aluminum; synthetics may likewise be employed, e.g., resistant polytetrafluoro-ethylene or transparent polymethacrylic acid esters.

Generally, a circular shape is preferred for the supporting face, but that is not mandatory, since specially shaped discs may render a different shape of the supporting face desirable. If the shape of the supporting face is not circular, the diameter of the supporting face means the diameter at the narrowest area. The nozzles or recesses should, in general, lie so near to the center of the supporting face, that the area between the recesses and the outer rim of the disc will be sufficient for supporting the disc with laminar gas flow; a further criterion being the rate at which the escaping gas is flowing.

A preferred embodiment of the supporting tool, according to the invention is one having three to five nozzles or recesses provided for the escape of the gas; or one with a circular nozzle; in the latter case, the distance between the nozzles for the escaping gas, measured on the periphery of a circle, according to the above definition, becomes zero.

In the embodiment having three to seven individual nozzles, the aperture angle of the cone, whose base is the face enclosed by the imaginary circle concentric with the supporting face, is preferably 50°–110°. The individual nozzles are bored into the holding face from the top and have usually a cylindrical cross section. Since these nozzles or recesses for the flow of gas are formed along the surface of a cone whose base is the area enclosed by the imaginary circle concentric with the supporting face, and since they allow the gas to flow into the interior of the body of the supporting tool, the exit opening of the nozzles in the supporting face deviates from the circular shape, even with a cylindrical cross-section of the interior. Preferably, the hollow cross-section should be so chosen that the radial widths of the recesses in the supporting face are between 0.2 and 2% of the supporting face-diameter, when the angular aperture of the cone is, as defined above, from 50°–110°.

The several nozzles open in the interior of the tool body centrally with respect to the supporting face, into a bore leading out of the body to the rear or to the side, the hollow cross-section of that bore being usually larger than that of the individual nozzles. The bore is connected, e.g., by means of a hose or a tube with a gas bottle or another suitable gas reservoir containing a suitable gas under pressure, e.g., air, nitrogen, carbon dioxide, or a noble gas, such as argon.

It is desirable to build into the handle of the tool a device for pressure regulation, e.g., a reducing valve. Also, in the handle, a switch should be provided, for instance, a push button, by which the gas stream to the supporting face can be entirely interrupted, in case it is desired to release a supported disc.

In a further special embodiment, the body of the tool is bored, starting from the supporting face, in the form of a funnel having an aperture angle of 20°–150°, preferably 50°–110°. Into the funnel, a core is fitted which has the shape of a truncated cone, with a base diameter being 0.2 to 0.6, the supporting face-diameter and an aperture angle 0° to 50°, preferably 10° to 30° larger than the funnel opening, but having a value between 20° and 150°, or, with the angle of the funnel between 50° and 110°, having a value not exceeding 50°-140°. The funnel opening at the supporting face is 0.02 to 1%, preferably 0.03 to 0.4% of the supporting face-diameter diameter larger than the core fitted into said funnel.

The core is held in the funnel, preferably in such a manner that it can be moved with respect to the center axis which makes it possible to adjust the width of the annular slot opening between core and funnel, within certain limits. The arrangement becomes quite simple, when the core fitted into the funnel is provided with a cylindrically-shaped extension, which is threaded at the outer circumference; the core can then be lifted and lowered and held in an adjusted position by means of a set screw. When the core is lowered, the gap can be appropriately reduced, whereby the velocity rate of gas escape is raised and the supporting effect on the disc is increased, while the amount of gas leaving the supporting face remains the same per time unit. However, the core should not be lowered too much, because the gas flow may become turbulent and no longer remains laminar, so that the disc will not be supported. On the other hand, the core should not be lifted beyond the level of supporting face, because this leads to a close absorption of the disc and a scratching of the surface. A further reduction of the gas rate can be achieved by reduction of the gas pressure by way of the regulating mechanism mentioned above, which can be housed in the handle of the tool.

In order to avoid a sliding off of the disc from the gas cushion, it is advisable to provide the holding tools — regardless of whether they have individual nozzles or a central annular nozzle — with a holding element at the rim, which consists of simple means, such as holding pins or holding segments on the periphery of the supporting face. The holding pins or holding segments should be streamlined, thus, e.g., wedge-shaped, in the direction of the oncoming gas, so that the gas stream will be as little obstructed as possible. In special cases, in which a lateral unloading of the discs is desired, movable rim holding devices are suitable, that permit the pins or segments to be folded back to the rear of the holding tool.

In one preferred embodiment, the supporting face is provided at the outer rim with a gas discharge ring, in which over 60 to 95% of the periphery are formed by slots for gas passage, the slots being placed in equidistant arrangement. The percentage indicates the total of the added slot length. The slots, or rather, the upper edges of the slots, that is, the boundary faces removed from the supporting face, lie at an acute angle of preferable 15°-50° with respect to the supporting face, which effects a re-direction of the gas stream emerging radially between the supporting face and supporting discs toward the rear of the holding tool. The height of the gas-passage slots should be about 1-4% of the supporting face diameter, at the narrowest place, and the radial width about 3-8%.

Holding tools with pins, segments or gas discharge rings serving as ring holding means, are capable of transporting discs having diameters of about 70-95% of the free supporting face, wherein it is understood that the face area minus the portion covered by the gas discharge ring.

When handling discs having a hole in the center, for instance, records, it may be desirable to secure the discs against sliding off by a pin at the center of the supporting face. Such a holding tool with central holding means may, of course, be additionally provided with a gas discharge ring.

The holding tool, according to the invention, can be used in principle for transportation of any type of discs. It is of particular usefulness in handling semi-conductor discs, e.g., when placing the discs on carrying plates, such as episusceptor plates in epitaxy, or polishing carrier plates in a polishing process, and furthermore, in loading or unloading palettes and trays. It is, in that case, possible to combine several holding tools to an operating unit. A further use is the secure fixation of discs in a corrosive or dirty media, for instance, in etching gases or liquids. It is an additional advantage of some significance that it is just the surface which is to be treated, e.g., in an epitaxial or polishing process, which is freed from dust to a large extent by the blowing gas stream, and that when liquids are used, the latter cannot penetrate between the disc and supporting face.

In comparison to known holding tools, the tool, according to the invention, has the advantage that due to the symmetric arrangement of the nozzles, a substantially equilibrated force is brought to bear on the discs, which will evenly lift these and, upon switching off the gas stream, drop them, so that lateral sliding off has not been observed. Moreover, the disc does not contact the supporting face at any place. Also, the supporting face may obtain a slight curvature toward the inside without any contact with the disc. This prevents the danger of pollution even more. The preferably provided gas discharge ring which permits the gas stream to be deflected toward the rear of the tool, makes it possible to take out one disc from a group of closely stacked discs, without the others being blown off; it also affords the possibility of combining several tools to a multiple tool unit.

Figure 1B:
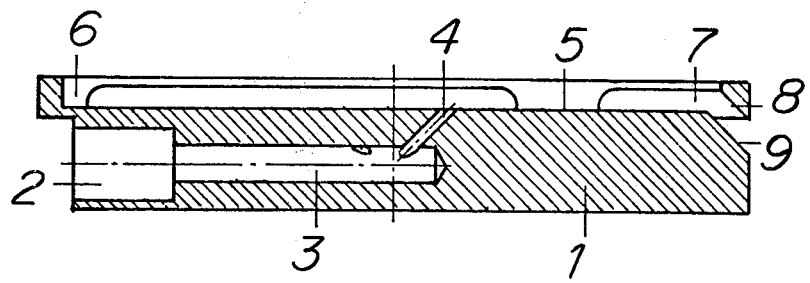

The holding tool, according to the invention, will now be more fully described with reference to the accompanying drawings in which;

FIG. 1a and 1b show one embodiment of the tool in plain view and in section, respectively, and FIG. 2a and 2b show similar views of a second embodiment.

In FIGS. 1a and 1b, a body 1 of the tool is shown consisting, e.g., of plexiglass. Bores 2 and 3 reach from the rim to the center, portion 2 near the rim having a diameter twice as large as inner portion 3. The portion 2 has, for example, an inner diameter of 6 mm. Into this wider portion, a handle (not shown) can be fitted, having a switching button and, if desired, a pressure-regulating mechanism for a gas which flows from a reservoir (not shown) through the bores 2 and 3, to three nozzles 4, from which it arrives at a supporting face 5 at an acute angle thereto. The three nozzles 4 having, e.g., a diameter of 1 mm. each, are positioned along the surface of a cone having an apex of, e.g., 90°, the radial widths of nozzles 4 in the supporting face 5 amounting to about 1.4 mm. The distance of the nozzles from each other is equal and amounts to 20.7 mm., measured on an imaginary circle in the supporting face 5 having a radius of e.g., 10 mm., which encloses the base of the cone on whose surface the nozzles are positioned. The supporting face 5, which is correlated to the other numerical figures given by way of example, has a diameter of about 55 mm. At the rim, the supporting face has a gas discharge ring 6 having a width of about 4 mm., which extends beyond face 5 and is provided with three slot-shaped passages 7 for the flow of the gas, which total about 70% of the periphery (see FIG. 1a). Boundary faces 8 of slots 7 are inclined at an angle of 45° with respect to the supporting face. The rim of body 1 is ground at the slots 7 in such a manner that a polished face 9 is formed which includes an angle of 135° with face 5. Face 9 is at the same time the lower boundary face of slots 7, which have a height of 1.5 mm. If, for example, the gas which is maintained at an over-pressure in the reservoir, flows into the tool at a pressure of 0.5 bar, a silicon disc of, e.g., 50 mm. diameter and a weight of 1.4 g can easily be supported by the supporting face 5 when it is brought near.

In FIGS. 2a and 2b, another embodiment consisting, e.g., of plexiglas of the holding tool, according to the invention, is illustrated by way of example. In that embodiment, a supporting face 25 of a body 20 has, e.g., a diameter of 80 mm., and has a funnelshaped bore 10 at the center, which has an aperture angle of e.g., 80°, and an effective diameter of 20 mm. A core 11, in the shape of a truncated cone consisting, e.g., of stainless steel, is fitted into the funnel 10, the truncated cone having a diameter of 19.8 mm. at the base and an aperture angle of 90°. The core merges into a cylindrical, hollow extension 12, having a threaded outer circumference 13, with a pitch of, e.g., 0.5 mm. and a diameter of, e.g., 10 mm. At the narrow end, extension 12 has an inner diameter of, e.g., 4 mm.; it may be connected to a gas reservoir by way of a pressure-regulating mechanism, but in any case, with a gas-checking switching device (both not shown). Core 11 can be lifted and lowered by the thread 13, whereby an annular slot opening 15 between core 11 and funnel opening 10 may be adjusted. A set screw 14 serves to fix the desired position.

When the holding tool is put into operation, gas flows through extension 12, e.g., over four holes 16 of about 2 mm. diameter at the top end into a free space 17 and through annular opening 15 at an acute angle into supporting face 25. At the rim of the supporting face, a gas discharge ring 26 is provided, having a height of, e.g., 45 mm. and a width of 4 mm. The ring has three slot-shaped passages 27 for the flowing gas, which total about 95% of the periphery. Boundary faces 28 of the slots 27 are inclined at an angle of 30° with respect to the supporting face 25. The rim of the face is ground at the slots in such a manner that a polished face 29 is formed with an angle of 150° with the supporting face. The width of the polished face 29 is 6 mm., the height of the slot 1 mm. When the gas, e.g., argon, flows into the extension 12 under a pressure of 0.5 bar, and the width of the slot is adjusted to 0.03 mm., silicon discs of 75mm. diameter and about 2.8 g weight, can easily be supported above holding face 25.

While only a few embodiments of the present invention are shown and described, many changes and modifications may be made thereunto, without departing from the spirit and scope of the invention.

What is claimed is:

1. An improved holding tool for contact-free support of discs of the type including a body having a supporting face, at least one bore within the body for connection with an extraneous gas reservoir and nozzle means in said body opening onto said support face and coupled to said bore for discharging gas streams from said reservoir through said bore and outwardly from said support face at an acute angle thereto, the improvement comprising:

a gas escape ring mounted on the outer edge of said support face of said body, said ring having slot-shaped passages formed therethrough extending over 60 to 95% of its circumference, and said ring having at least one wall defining the more-distant boundary faces of the slotted passages with respect to the supporting face which is disposed at an acute angle with respect to said supporting face.

2. The holding tool, according to claim 1, wherein the acute angle between the boundary face of the slotted passages and the supporting face, is from 15°–50°.

3. The holding tool, according to claim 1, wherein the height of the slotted passages, is 1–4% of the supporting face-diameter at the narrowest part of the slotted passages.

4. The holding tool, according to claim 1, wherein the gas escape ring has a radial width of 3–8% of the supporting face-diameter.

5. An improved holding tool for contact-free support of discs of the type including a body having a front supporting face, at least one bore within the body for connection with an extraneous gas reservoir and nozzle means in said body opening onto said support face and coupled to said bore for discharging gas streams from said reservoir through said bore and outwardly from said support face at an acute angle thereto, the improvement comprising:

a gas escape ring mounted on the outer edge of said support face of said body, said ring having slot-shaped passages formed therethrough extending over 60 to 95% of its circumference, which passages are configured and disposed to redirect the gas stream, emerging from said nozzle means and impinging on a disc supported above the support face, in a generally reverse direction toward the rear of the body of said tool.

* * * * *